US005734752A

United States Patent [19]
Knox

[11] Patent Number: 5,734,752
[45] Date of Patent: Mar. 31, 1998

[54] DIGITAL WATERMARKING USING STOCHASTIC SCREEN PATTERNS

[75] Inventor: Keith T. Knox, Rochester, N.Y.

[73] Assignee: Xerox Corporation, Stamford, Conn.

[21] Appl. No.: 719,235

[22] Filed: Sep. 24, 1996

[51] Int. Cl.$^6$ .......................... G06K 9/74; H04N 1/405; H04N 1/52
[52] U.S. Cl. .......................... 382/212; 382/237; 358/536; 358/456; 380/54; 283/113
[58] Field of Search .......................... 382/219, 212, 382/218, 278, 283, 294; 380/6, 9, 18, 23, 54, 59, 51; 283/901, 113

[56] References Cited

U.S. PATENT DOCUMENTS

| | | | |
|---|---|---|---|
| 3,675,948 | 7/1972 | Wicker | 283/901 |
| 5,315,098 | 5/1994 | Tow . | |
| 5,337,361 | 8/1994 | Wang et al. | 380/51 |
| 5,341,228 | 8/1994 | Parker et al. . | |
| 5,396,559 | 3/1995 | McGrew | 380/54 |
| 5,488,664 | 1/1996 | Shamir | 380/54 |
| 5,583,950 | 12/1996 | Prokoski | 382/212 |

FOREIGN PATENT DOCUMENTS

| | | |
|---|---|---|
| 651554 | 5/1995 | European Pat. Off. . |
| 705025 | 4/1996 | European Pat. Off. . |

OTHER PUBLICATIONS

Tuhro, "Counterfeit Detection Method", Xerox Disclosure Journal, vol. 20, No. 6, Nov./Dec. 1995.

"Cloaking Device for Top–Secret Faxes", Electronic Imaging Review, Center for Electronic Imaging Systems, University of Rochester, Rochester, NY, Fall, 1995, vol. 2, No. 3, p. 4.

"Digimarc Corp. Announces New Copyright Protection Technology; Irremovable Signatures Protect Creative Property in the Digital Age," Jun. 28, 1995, Business Wire.

"Dice and Digimarc File for Patents for 'Scatter–Gun' Electronic Watermark Technology," Oct. 4, 1995, Computergram International.

"Holographic signatures for digital images; authentication, verification and protection for copyright holders" (Digimarc Corp's copyright protection technology), Aug. 14, 1995, Seybold Report on Desktop Publishing, v. 9, n. 12, p. 23 (2).

"NEC develops digital watermarking technique protecting copyrights of images and music on Internet," Feb. 12, 1996, Business Wire.

"NEC Develops Digital Watermark Technology," Feb. 20, 1996, Newsbytes; NEC Develops Electronic Water Mark in the U.S., Feb. 15, 1996, Computergram International, n. 852.

"NEC Develops Electronic Water Mark in the U.S.", Feb. 15, 1996, Computergram International, n. 852.

*Primary Examiner*—Scott Rogers
*Attorney, Agent, or Firm*—Mark Costello

[57] ABSTRACT

A method for generating watermarks in a digitally reproducible document which are substantially invisible when viewed including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

16 Claims, 4 Drawing Sheets

Pattern #1

Pattern #2

Pattern #1

FIG. 4

Pattern #2

Pattern #1    Pattern #2

FIG. 5

```
                        Decoding
                           │  Coding Plane
                           │    │
PLANE                      ↓    ↓
 1  2  3  4  5  6  7  8
 1  1  0  1  1  1  1  1  ⎫  Correlated area:
 1  0  1  1  1  1  0  0  ⎭    no watermark
 1  0  1  1  1  0  1  0  ⎫  Uncorrelated area:
 1  0  1  0  1  1  0  1  ⎭      watermark
```

*FIG. 6*

DIGITAL WATERMARKING USING STOCHASTIC SCREEN PATTERNS

The present invention is directed to a process for applying a digital watermark to a sheet to enable verification of its authenticity and more particularly, to digital watermark patterns which are substantially invisible when viewed without the aid of unique visualization key.

BACKGROUND OF THE INVENTION

Watermarks have long been used in the printing industry to identify the source or origin of a document. Generally, a watermark has appeared as a faint pattern in an image which is visible only when the original document is viewed in a particular manner. Unless a copyist had access to the watermarked paper, it would be difficult for him to reproduce the document without showing its inauthenticity. That is to say, without the paper on which the original image was originally printed, the copy should be readily detectable. However, as people move away from the use of watermarked papers for cost and other practical reasons, it is still necessary to identify the source or origin of a document image.

The introduction of the plain paper copier has resulted in a proliferation of paper copies of paper originals. A similar result is happening to electronic images, given the easy availability of scanners and a quick and widespread access to images throughout the Internet. It is now very difficult for the creator of an image to generate an electronic original, for which he can be assured that illegal copies will not be spread to third parties. The use of a digital watermark is a technology that aims to prevent that spread, by incorporating an identifying mark within the image that allows one to identify the source of the image in an electronic copy. It is important that the identifying mark not be disturbing or distracting to the original content of the image, while at the same time, allowing an easy identification of the source. The watermarks could be added either by the scanner or by the halftoning software.

Watermark identification may be accomplished by embedding a digital watermark in a digital or printed page which will identify the owner of rights to the image. In the past, these images have been produced and delivered in hard copy. In the future, these images will be distributed mainly in digital form. Therefore, image identification will have to work for both hard copy and digital image forms.

Watermarking can take two basic forms, visible and invisible. Visible watermarks are marks such as copyright logos or symbols or logos that are imprinted into the digital or printed image to be distributed. The presence of the watermark is made clearly visible in the image in a way that makes it difficult to remove without damaging the image. The presence of the visible watermark does not harm the usefulness of the image, but it prevents the image from being used without permission. However, visible watermarks may interfere with the use of the image or with the image aesthetics. The visible watermark is also a potential target for fraud, in that it is possible for a fraudulent copier of the image to identify the location of the watermark and attempt to reproduce the image without the watermark.

Invisible watermarks are marks such as copyright symbols, logos, serial numbers, etc. that are embedded into digital or printed images in a way which is not easily discernible to the eye. At a later time, the information embedded in these watermarks can be derived from the images to aid identification of the source of the image, including the owner and the individual to whom the image is sold. Such watermarks are useful for establishing ownership when ownership of an image is in dispute. They will be less likely to be useful as a deterrent to the theft of the image.

While either or both visible or invisible watermarks are desirable in an image, they represent different techniques for either preventing copying or detecting copying. It is anticipated that document producers will wish to use both kinds of protection.

A method of embedding information into halftones was suggested by Tuhro, "Counterfeit Detection Method", Xerox Disclosure Journal, Vol. 20, No. 6, November/December 1995. This method would make slight deviations in the position of the halftone dots from cell to cell. Alternatively, the position of a line screen could be varied by small amounts to encode information. The decoding would be accomplished by laying a halftone screen that has no such deviations, on top of the encoded image. The locations of the halftone cell deviations, show up as a beat pattern. The difficulty of this method is that the information could easily be lost within the printer distortions. The goal would be to make the deviations as small as possible to avoid their being seen. This results in the deviations being hard to detect as well.

A second method is described in U.S. patent application, Ser. No. 08/463,178, filed Jun. 5, 1995, in the name of Curry, and assigned to the same assignee as the present invention. This method processes halftone dots, called serpentine dots, that are symmetric in shape. These dots are designed to fit well together when rotated and placed side by side. This enables different rotations of the dots to be placed across the page, encoding arbitrary information into the halftone pattern. From a visual inspection, the changing shapes of the symmetric patterns are not displeasing to the eye. This method suffers from the same problems as the method by Tuhro. In order to make sure the information cannot be seen by the eye, the halftone cells need to be made as small as possible. As cell size is reduced, it becomes harder to detect cell orientation.

Yet another process for embedding information into an image is through the use of glyphs. Glyphs, the subject of Xerox patent U.S. Pat. No. 5,315,098 to Tow are small three to five pixel length lines in which the orientation of the line represents one of a small number of values. Thus, a stream of data can be represented by glyphs each line varying in orientation in order to provide an encoded view of the information. Glyphs differ from watermarks in that the glyphs encode information via some numerical method, while watermarks represent the actual image. The glyphs may be machine readable by means of human invisible characteristics of the print materials, such as their infrared reflectivity, their high resolution spectral detail, their metameric spectral characteristics, or their magnetization. These machine detectable materials may be incorporated into the same printing process that is employed for printing the human readable rendering, such as by utilizing xerographic toners which have machine recognizable, human invisible characteristics, together with their usual visible characteristics of color, whiteness, blackness, transparency and opacity.

U.S. Pat. No. 5,337,361 to Wang et al describes an information area that can overlay a graphic image and include information encoded in an error correctable, machine readable format, which allows recovery of the information despite distortions due to the underlying graphic image. The record may also represent the image by words similar in form to words in the image area. Both the image information and the graphic words can then be altered when an action regarding the record takes place. Wang et al differs from the present invention in that it essentially provides a bar code encoding information other than the image that is desired to be seen.

"Cloaking Device for Top-Secret Faxes", Electronic Imaging Review, Center for Electronic Imaging Systems, University of Rochester, Rochester, N.Y., Fall, 1995, Vol. 2, No. 3, Page 4, details software which supports an encryption method so that all the pages look the same: a random pattern of black and white dots filled with tiny black worms. The page is decrypted by placing a decryption key over the page. Text appears as either white lettering against a black background or dark lettering against a white background. Notably, in the images shown, the regions where the image is located is discernible via changes in the random pattern of black and white dots Several articles referencing a method of adding a digital water mark are noted with respect to Digimarc Corp.: "Digimarc Corp. Announces New Copyright Protection Technology; Irremovable Signatures Protect Creative Property in the Digital Age," Jun. 28, 1995, Business Wire, describes a copyright protection system in which hidden information is available with an image. See also, "Dice and Digimarc File for Patents for 'Scatter-Gun' Electronic Watermark Technology," Oct. 4, 1995, Computergram International; "Holographic signatures for digital images; authentication, verification and protection for copyright holders" (Digimarc Corp's copyright protection technology), Aug. 14, 1995, Seybold Report on Desktop Publishing, v.9, n. 12, p23(2).

Also note, "NEC develops digital watermarking technique protecting copyrights of images and music on Internet," Feb. 12, 1996, Business Wire, describes watermark information hidden in an image, using the spectral components of the data in a manner analogous to spread spectrum communications. See also, "NEC Develops Digital Watermark Technology", Feb. 20, 1996, Newsbytes; "NEC Develops Electronic Water Mark in the U.S.", Feb. 15, 1996, Computergram International, n.852.

EP 0651 554 A1 (Eastman Kodak) and EP 0705 025 A2 (Eastman Kodak) describes a method of storing component parts of a watermark in hierarchical elements of a hierarchically stored image.

The references described above are all incorporated by reference herein for their teachings.

SUMMARY OF THE INVENTION

The present invention is directed to a method for providing substantially invisible watermarks in a digitally reproducible document.

In accordance with one aspect of the invention, there is provided a method for generating watermarks in a digitally reproducible document which are substantially invisible when viewed including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

A stochastic screen can be used to produce an invisible watermark. A stochastic halftone cell is a large threshold array that produces random appearing patterns in the halftone image. To produce an invisible watermark, at least one additional stochastic cell is produced and used to incorporate watermark information into the document. In the following embodiment only one additional stochastic screen cell will be described. This is not intended to limit the number of cells that can be used, since the extension to more stochastic screen cells is straightforward.

To produce an invisible watermark, a first stochastic screen is produced to reproduce a gray image with acceptable image quality. A second stochastic screen is produced that is related to the first. Over most of the two halftone cells, the thresholds are identical, and therefore the patterns they produce are correlated. Over a part of the second halftone cell, the thresholds are randomized so that in this region the two cells are uncorrelated. The locations of the thresholds within this area are optimized a second time to produce pleasing patterns. In this way, the second stochastic cell produces patterns of the same image quality as the first cell. When an image is halftoned with these two cells and the images overlaid, the regions that are uncorrelated will appear darker. By alternating the two halftone cells, information can be incorporated into the halftoned image.

The present invention allows for a gray pattern to be used on a document, where the gray pattern can be generated using a stochastic halftoning process to produce a desirable gray. However, using such techniques, the random nature of the screen affords the opportunity to include a unique authentication procedure in conjunction with a "key" page which includes both a first stochastic screen and a second stochastic screen.

These and other aspects of the invention will become apparent from the following descriptions to illustrate a preferred embodiment of the invention read in conjunction with the accompanying drawings in which:

Figure 1:
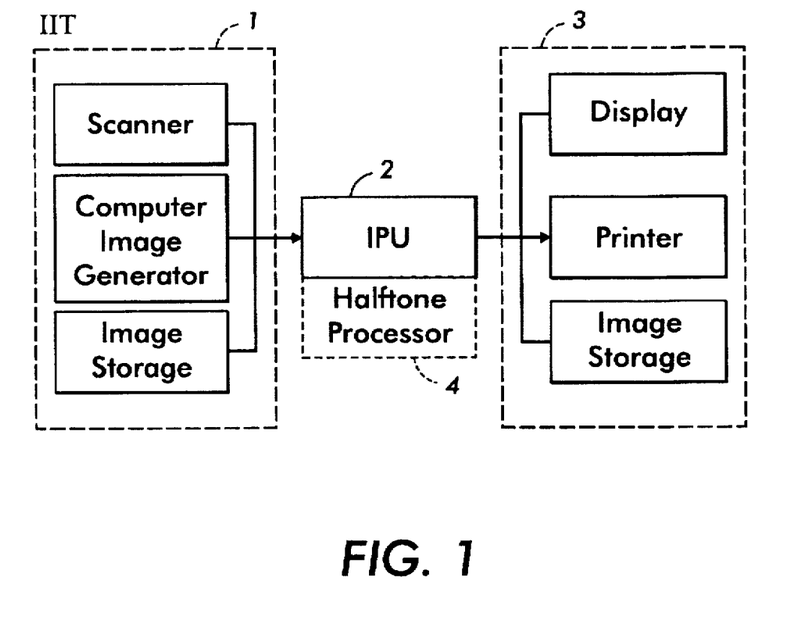
FIG. 1 represents a system in which the present invention may find use.

Referring now to the drawings, where the showings are for the purpose of describing the preferred embodiment of the invention and not for limiting same, a basic system in which the present invention may find use is illustrated in FIG. 1. In our description, we will focus on two aspects of the present invention. The first aspect will entail the creation of the stochastic screens required for implementation. In the second aspect, we will focus on the generation of watermark images suitable for use by the present invention.

Initially, we begin with gray image signals which have a gray level which we have decided is desirable for use in the watermark. The gray signals are typically in continuous tone pattern and may be characterized as pixels or image signals which are defined at a single level or optical density in a set of optical density levels. Each pixel will be processed in the manner described hereinbelow.

To redefine each pixel in terms of a new and smaller set of D levels, the pixels will be processed by the stochastic screen processor herein described. In this process, c and d are integer values representing pixel depth, or a number of signal levels at which pixels may appear. Commonly, output printers will reproduce these image pixels with one or two legal allowed or binary levels for printing. Color gray levels would reproduce similarly, except that they would appear and be identified in association with a particular primary or secondary color separation for reproduction. With reference now to FIG. 1 which shows a general system requirement representing the goal of the invention, an electronic representation of an original document from an image input terminal 1 in a format related to the characteristics of the device and commonly with pixels defined at N bits per pixel. The electronic image signals will be directed through an image processing unit 2 to be processed so that an image suitable for reproduction on image output terminal 3 is obtained. Image processing unit 2 commonly includes a halftone processor 4 which converts M bit digital image data signals to N bit image data signals suitable for driving a particular printer or other device where M and N are integer values. Commonly, the images may be represented by a page description language file, describing the appearance of the page. In such a case, the IPU may include a processing element for decomposition of the page, and color conversion elements for providing appropriate signals to drive a printer.

Figure 2:
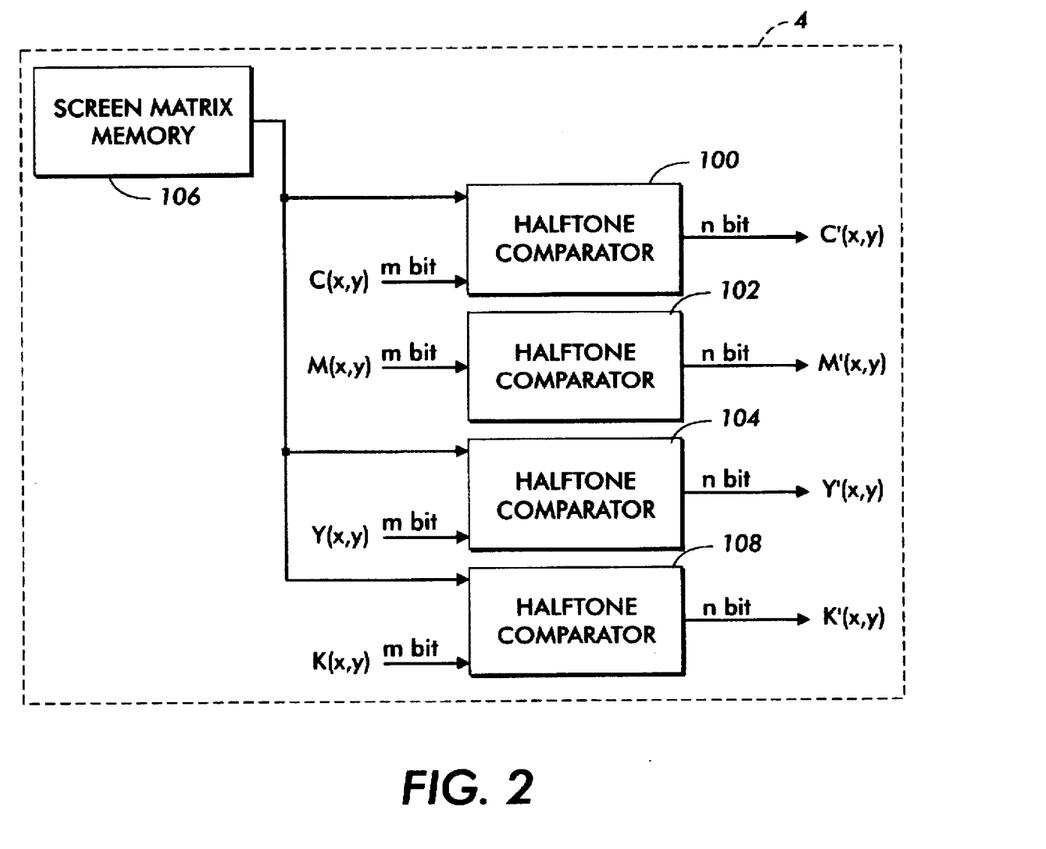
FIG. 2 is an illustration of a halftoning arrangement to produce a stochastic screen such as that required in the present invention.

FIG. 2 shows the halftone processor 4 operational characteristics. In this example, there is illustrated a color processing systems using four separations, C(x,y), M(x,y), Y(x,y), and K(x,y), obtained in each process independently for halftoning purposes to reduce an M-bit input to an N-bit output. It will be appreciated that the invention is also applicable to the single separation or black and white reproduction situation as well. Accordingly, we show a source of screen matrix information, screen matrix memory 106 which provides one input to each comparator 100, 102, 104, 106, and 108 for each separation where the other comparator is the M-bit separation bit map. The output is N-bit output which can be directed to a printer. This illustration is highly simplified in that distinct screen matrices may be supplied to each comparator.

Now the principle of stochastic screening will be discussed. In this discussion an method of generating stochastic screens will be discussed. Other methods of generating such screens, perhaps including U.S. Pat. No. 5,341,228 to Parker et al., a halftoning system using a stochastic process known as a blue noise mask, may be useful. Here, we use the stochastic screening method described in U.S. patent application Ser. No. 08/663,419, filed Jun. 17, 1996, by Shen-ge Wang, and assigned to the same assignee as the present invention.

Consider generating halftone images from constant gray-scale inputs by a screen matrix with N elements. If the overlap between adjacent pixels is ignored, the screen cell with n black pixels and N−n white pixels simulates the input with a gray scale (g) equal to g=(N−n)/N, where $0 \leq n \leq N$, or $0 \leq g \leq 1$. The visual appearance of this pattern depends on whether the black pixels or the white pixels are minorities. If the black pixels are, i.e., $0.5 < g \leq 1.0$, the best visual appearance of the halftone pattern occurs when all black pixels are "evenly" distributed, in other words, each black pixel should "occupy" $1/n$, or $1/(1-g)N$, fraction of the total area of the screen. Therefore, the average distance of adjacent black pixels should be equal to $\alpha(1-g)^{1/2}$, where $\alpha$ is independent of gray levels. On the other hand, if the white pixels are minorities, i.e., $0 \leq g \leq 0.5$, each white pixel should "occupy" $1/(n-m)$ or $1/gN$, fraction of the total area and the average distance of adjacent white pixels should be equal to $\alpha g^{-1/2}$. An idealized stochastic dithering screen is defined as a threshold mask generating halftone images which satisfy above criterion for all gray levels.

For the following discussion, the input gray-scale images are specified by integer numbers, G(x, y), where $0 \leq G \leq M$. Under this assumption the dithering screen should have M different threshold values spanning from zero to M−1. We further assume that at each level there are (N/M) elements having the same threshold value T. The ultimate goal of designing a stochastic screen is to distribute the threshold values T so that the resulting halftone images are as close as possible to the ones generated by an idealized stochastic screen. Here, it is demonstrated that it is possible to create "good quality" stochastic screens using above criterion and optimization techniques.

Choosing an arbitrary pair of pixels from the dithering screen, we assume that the threshold values for these two pixels are $T_1 = T(x_1, y_1)$ and $T_2 = T(x_2, y_2)$, respectively, where $(x_1, y_1)$ and $(x_2, y_2)$ are the coordinates of these pixels. As the result of dithering a constant input G, the outputs $B_1 = B(x_1, y_1)$ and $B_2 = B_2(x_2, y_2)$ have the following possible combinations:

1. $B_1 = 1$ and $B_2 = 1$, if $G \geq T_1$ and $G \geq T_1$;
2. $B_1 = 0$ and $B_2 = 0$, if $G < T_1$ and $G < T_2$;
3. $B_1 \neq B_2$, where B=1 represents a white spot and B=0, a black spot for printing. Under case 3, where one output pixel is black and another is white, their distance is irrelevant to the visual appearance according to the criterion discussed above. For case 1, we can further consider the difference between the two situations:

1a. if $M/2 \geq G$, $G \geq T_1$, $G \geq T_2$;
1b. elsewhere.

Under case 1a both output pixels are white, and white spots are minorities. Therefore, the corresponding distance between $(x_1, y_1)$ and $(x_2, y_2)$ is relevant to the visual appearance of the halftone images. According to our analysis above this distance is greater or equal to $\alpha g^{-1/2}$, or $\alpha(G/M)^{-1/2}$, for outputs of an idealized stochastic screen. Among all G under case 1a, the critical case of G is the smallest one, or $G_c = \text{Max}(T_1, T_2)$, which requires the largest distance between the two pixels $(x_1, y_1)$ and $(x_2, y_2)$.

Similarly, when both dots appear as black dots, the visual appearance under the following cases must be considered:

2a. if $G \geq M/2$, $G < T_1$ and $G < T_2$
2b. elsewhere.

Among all G under 2a, the largest G is given by $G_c = \text{Min}(T_1, T_2)$, which requires the largest distance $\alpha(1 - G_c/M)^{-1/2}$ between $(x_1, y_1)$ and $(x_2, y_2)$.

Mathematically, we can use a merit function $q(T_1, T_2)$ to evaluate the difference between the idealized stochastic screen and the chosen one. For example, we used the following choice for the experiment described later:

$$q(T_1, T_2) = \exp(-C \cdot d^2/d_c^2), \qquad (1)$$

where $d^2 = (x_1 - x_2)^2 + (y_1 - y_2)^2$;

$d_c^2 = M/M - \text{Min}(T_1, T_2)$, if $T_2 > M/2$ and $T_1 > M/2$, $d_c^2 = M/\text{Max}(T_1, T_2)$, if $T^2 \leq M/2$ and $T_1 \leq M/2$, $d_c^2 = 0$, i.e., q=0, elsewhere;

and C is a constant.

Since a dithering screen is used repeatedly for halftoning images larger than the screen, for any chosen pair of pixels from the dithering screen the closest spatial distance in corresponding halftone images depends on the dithering method and should be used for the merit function. The overall merit function should include contributions of all possible combinations. In an experiment the summation of $q(T_1, T_2)$ was for optimization, i.e., $$Q = \Sigma q(T_1, T_2), \text{ where } \Sigma \text{ for all } (x_1, y_1) \neq (x_2, y_2). \quad (2)$$

Now, the design of stochastic screens becomes a typical optimization problem. When the threshold values of a chosen screen are rearranged the merit function can be evaluated to determine the directions and steps. Many existing optimization techniques can be applied to this approach. The simplest method is to randomly choose a pair of pixels and swap threshold values to see if the overall merit function Q is reduced. Since only those Q values related to the swapped pair need to be recalculation, the evaluation of Q does not consume significant computation time.

In an example, using the proposed design procedure to produce a screen matrix with 128×64 elements and 256 gray levels was produced. All initial threshold values were randomly chosen by a standard random number generator. Alternatively, the threshold assignments from an existing screen may be used. Besides the Gaussian function described by Eq. (1) as the merit function other functions were tested, such as the Butterworth function and its Fourier transform. Other optimization functions are possible. For this example, Equations (1) and (2) were used as the merit function of optimization. Since this mask is a 45° rotated screen, the 128×64 pattern is repeated with a lateral shift equal to 64. To calculate the overall merit function we considered all pairs of pixels including those with the shift. A Sun Sparc 10 workstation was used for this design test.

For each iteration we randomly chose a pair of pixels from the dithering screen, swapped their threshold values and calculated the change of the merit function Q. If Q was not reduced, we restored the threshold values, otherwise, we proceeded to the next iteration.

To generate a stochastic screen containing an invisible digital watermark, an arbitrary random arrangement of threshold values is first loaded into the stochastic screen processor. To generate the pattern, the first screen is then optimized as per the stochastic screen process.

Figure 3:
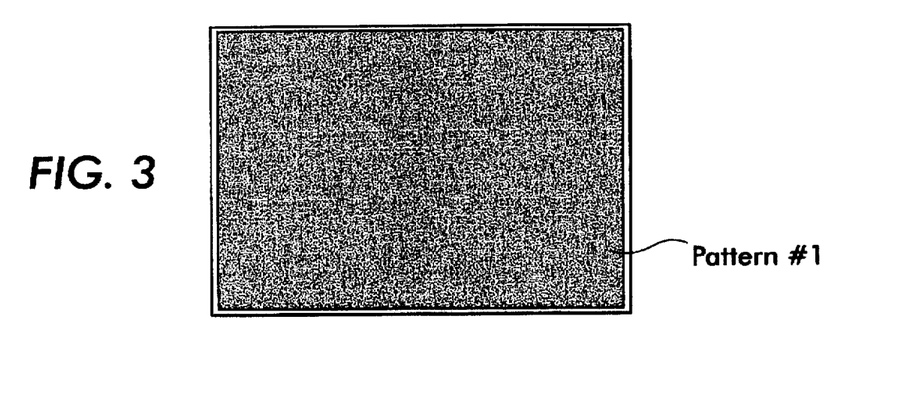
FIG. 3 is an illustration of a first stochastic screen.

Turning now to FIG. 3 and an implementation of the invention, there is shown a first gray pattern produced by the stochastic screening process described. This pattern is a single gray level and it is designed so that the patterns it generates are high frequency patterns that have very little power in low spatial frequencies. The design procedure takes into account wraparounds so that there are no edge effects when the pattern is replicated across the page, as it will be with the repeat of each cell.

Figure 4:
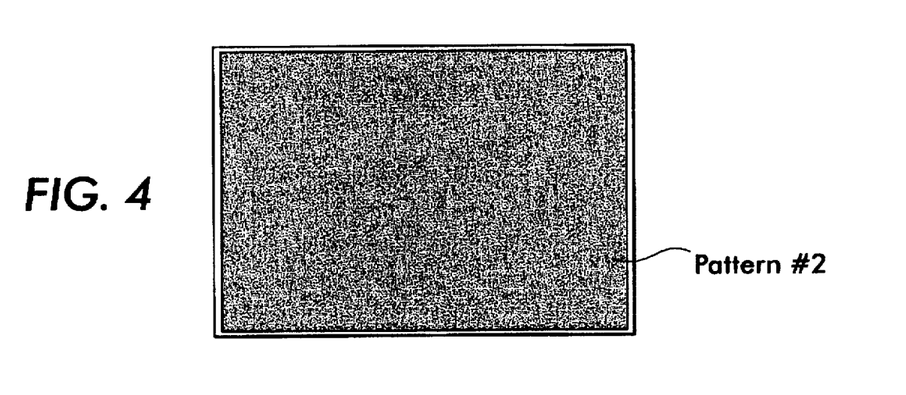
FIG. 4 is an illustration of a second stochastic screen.

FIG. 4 shows a second stochastic screen. To generate the screen pattern of FIG. 4, at least a part of the first screen seed is randomized and then optimized based on the new seed. Without close examination, the screen will look very much like the first pattern and, as described above, in fact was generated from the first pattern. If the part of the pattern that is randomized and re-optimized is not near the edges of the cell, then when the two screens are placed next to each other, neither can be distinguished from the other. On the other hand, when the pattern of FIG. 3 is placed on top of FIG. 4, the encoded information reveals itself. The information is encoded in the correlation between the two patterns, across broad areas, and not in fine details or patterns.

Figure 5:
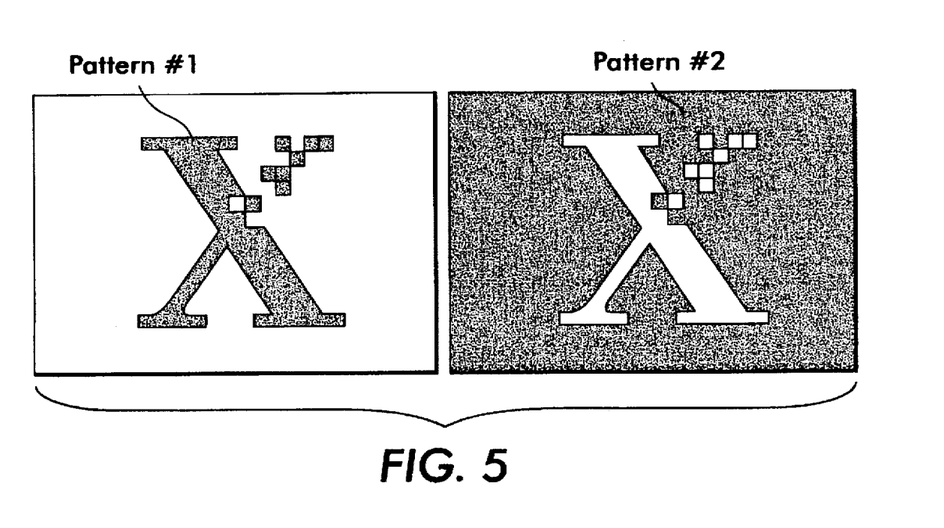
FIG. 5 is an illustration of the stochastic screen with the areas outlined in which the image information occurs.
Figure 6:
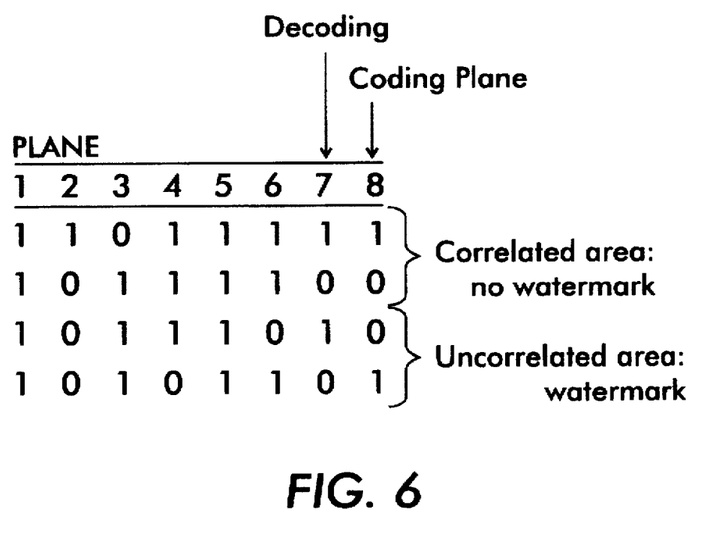
FIG. 6 is a composite image of FIGS. 3 and 4 showing the correlation of areas using first stochastic screen in the non-correlation of areas using second stochastic screen producing the images described for the present invention.

In accordance with FIG. 4, in the areas corresponding to the figure X that appears in FIG. 5, the first screen elements are moved and the second screen elements are replaced therefor within those areas. Since the patterns are both based on the same random screen optimization or similar random screen optimizations, the patterns look approximately identical. However, when one screen is superimposed on another screen, as for example, by the mechanical action of printing the second screen with the patterns thereon on a transparency and carefully placing it in alignment and superposition with the first screen, the correlation and non-correlation between the images becomes apparent.

In an alternate method to replacing parts of two different documents, the information may also be incorporated by alternating between the two halftone dots while halftoning the original document. It is not necessary to alternate on cell boundaries, but that is a convenient boundary on which to switch between halftone cells.

In use, it can be seen that documents with either of the image with the first screen, or the image with the embedded second screen, or images with a combination of the two screens can be given out as watermarked pages. To authenticate the document, if printed, a slide or transparency having the image of the complementary screen can be superposed over the document to see if the second screen images appear in the uncorrelated areas.

Alternatively, if the document to be printed is received electronically, the complementary image may be combined with the electronic image by logical operations. An example would be to choose a logical operation that results in a black pixel, if either of the corresponding pixels in the two images are black, or in a white pixel, otherwise.

In another embodiment of the invention, the watermark can be inserted into continuous tone images, where each pixel is represented by a number of bits. In one group of standard continuous tone images, where each pixel is represented by 8 bits of data, the described stochastic screen images can be inserted into the image data at the least significant bit plane. At this bit, the data is usually considered noise in the image. Inserting image information into the least significant bit plane for each pixel of a continuous tone image is a known process however usually the identification information is visually recognizable information, such as a logo or other symbol. In this invention, the information included in the least significant plane would be the halftone of a constant or slowly varying region. In this way, it would not be recognizably an image or a watermark, but instead the logo or watermark information would be included in the changing correlation statistics of the halftone cells used to generate the plane.

Alternatively, in accordance with the invention, the decoding screen may be inserted into the next to the least significant bit plane for each pixel in the continuous tone image. In that manner, the correlation of the two planes will provide the watermark image.

In yet another alternative embodiment of the invention, the next to the least significant bit plane of the image, which is substantially random in nature, can be copied to the least significant bit plane. These two planes should then appear correlated at every pixel in the image. To insert the authentication image, the correlation is periodically destroyed in one or both of the planes, by randomizing one of the planes in information-dependent regions of the plane.

In yet another embodiment, in color images, the least significant planes of the different color separations may be combined by copying the least significant plane of one color separation to the least significant plane of another separation. To insert the authentication image, the correlation is periodically destroyed in one or both of the planes, by randomizing one of the planes in information-dependent regions of the plane.

In still another application of the invention, Curry's serpentine halftone dots are altered so that they represent a random pattern of halftone dots. When second image is generated with the same halftone dots, and other random patterns inserted, the serpentine dot method would become more robust at higher spatial frequencies.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

I claim:

1. A process for generating a document to be authenticated, wherein an authentication image inserted therein is not readily visually perceptible, including the steps of:
    generating a first stochastic halftone pattern, and generating a first user image using said first stochastic halftone pattern;
    generating a second stochastic halftone pattern, related and distinct from the first;
    generating a second user image using the first stochastic halftone pattern, and replacing portions of said second user image using the second stochastic pattern to form the authentication image therein;
    whereby upon placing the first and second user images in superposition relationship to allow viewing of both user images together, correlation between the first stochastic halftone pattern in the first and second user images occurs everywhere within the first and second user images where the first stochastic halftone pattern is used, and visible non-correlation occurs where the area where the second stochastic pattern occurs and the authentication image placed therein using the second stochastic screen becomes visible to authenticate the document to be authenticated.

2. The process as described in claim 1, wherein said each of said first and second stochastic patterns are related as high spatial frequency patterns with relatively low power in any low spatial frequencies.

3. The process as described in claim 1, wherein said document to be authenticated is a color document comprising plural separations, and said first stochastic pattern is used in one of said separations in said first user image, and said first and second stochastic patterns are used together in one of said separations in said second user image.

4. The process as described in claim 1, wherein the document to be authenticated is a color document comprising plural separations, and said first stochastic pattern is used in one of said separations in said first user image, and said first and second stochastic patterns are used together in a distinct one of said separations in said second user image, which will not be printed or displayed with the same color as the separation which the first user image is printed or displayed.

5. A method of providing a document to be authenticated including the steps of:
    generating a first user image from a first stochastic halftone pattern;
    generating a second user image, using the first stochastic halftone pattern and a second, different stochastic halftone pattern, said second stochastic pattern used to form an authentication image in the second user image;
    for a document to be authenticated and distributed, including therein one of said first and second user images;
    providing the other of said first and second images to a user for authentication purposes;
    providing a viewing arrangement to view said first and second user images in registered superposition, whereby correlation areas and non-correlation areas render said authentication image visible therein.

6. The method as described in claim 5, wherein said each of said first and second stochastic patterns are related as high spatial frequency patterns with relatively low power in any low spatial frequencies.

7. A method of providing a document to be authenticated including a continuous tone image, said continuous tone image defined pixels each having an intensity defined by an N-bit pixels, including:
    generating a first user image from a first stochastic halftone pattern comprising binary values representing said first user image;
    generating a second user image, using the first stochastic halftone pattern and a second, different stochastic halftone pattern, comprising binary values representing said second user image, said second stochastic pattern used to form an authentication image in the second user image;
    receiving said document containing said continuous tone image defined by pixels, the intensity of which are defined by N-bit values;
    for an area of the document containing said continuous tone image, replacing a first less significant bit value, with binary values from said first user image.

8. A method of authenticating a document processed in accordance with claim 7, including:
    for an area of the document containing said continuous tone image, replacing a second less significant bit value, with binary values from said second user image;
    detecting areas of correlation and non-correlation between the first and second less significant bits, which together will render the authentication image visible.

9. The method as described in claim 7 wherein said each of said first and second stochastic patterns are related as high spatial frequency patterns with relatively low power in any low spatial frequencies.

10. A method of providing a document to be authenticated including a continuous tone image, said continuous tone image defined pixels each having an intensity defined by an N-bit pixels, including:

receiving said document containing said continuous tone image defined by pixels, the intensity of which are defined by N-bit values, as a first user image;

generating a second continuous tone user image defined by pixels, the intensity of which are defined by N bit values, including a set of binary values at a less significant bit thereof, which are derived from a less significant bit of the first user image;

inserting into the second user image, an image pattern varying from said second user image, to form an authentication image in the second user image.

11. A method of authenticating a document processed in accordance with claim 10, including:

detecting areas of correlation and non-correlation between the first and second less significant bits, which together will render the authentication image visible.

12. A document authentication set, said document set including a first document to be authenticated, including an authentication pattern thereon;

a second document, prepared on a transparent substrate, to authenticate the first document, including an authentication pattern key thereon;

said authentication pattern including:

a first user image generated from a first stochastic pattern and a second user image using the first stochastic halftone pattern, and replacing portions of said second user image using a second stochastic pattern to form the authentication image therein;

whereby, when the first and second documents are superposed, correlation between the first stochastic halftone pattern in the first and second user images occurs everywhere within the first and second user images where the first stochastic halftone pattern is used, and non-correlation occurs where the area where the second stochastic pattern occurs and the authentication image placed therein using the second stochastic screen becomes detectable to authenticate the document to be authenticated.

13. A method for generating watermarks in a digitally reproducible document which are substantially invisible when viewed including the steps of:

(1) producing a first stochastic screen pattern suitable for reproducing a gray image on a document;

(2) deriving at least one stochastic screen description that is related to said first pattern;

(3) producing a document containing the first stochastic screen;

(4) producing a second document containing one or more of the stochastic screens in combination, whereby correlation between the first stochastic pattern on each document occurs everywhere within the documents where the first screen is used, and correlation does not occur where the area where the derived stochastic screens occur and the image placed therein using the derived stochastic screens becomes detectable.

14. A method of providing a document to be authenticated including a continuous tone image described by at least one separations, each separation of said continuous tone image defined by pixels each having an intensity defined by N-bits, including:

generating an authentication image from a first pattern comprising binary values in a less significant bit in one of said separations;

generating an authentication key image, using the first pattern and a second, different pattern, in a different less significant bit in one of said separations;

whereby upon placing the authentication image and key in superposition relationship to allow viewing of both user images together, correlation between the first stochastic halftone pattern in the first and second user images occurs everywhere within the first and second user images where the first stochastic halftone pattern is used, and visible non-correlation occurs where the area where the second stochastic screen occurs and the authentication image placed therein using the second stochastic pattern becomes visible to authenticate the document to be authenticated.

15. The method as provided in claim 14, wherein said first and second patterns are stochastic halftone patterns.

16. The method as provided in claim 14, wherein said first and second patterns are derived from the continuous tone image.

* * * * *